United States Patent
Wu

(10) Patent No.: US 12,258,990 B2
(45) Date of Patent: Mar. 25, 2025

(54) FASTENER DEVICE

(71) Applicant: Yi-Chang Wu, Taoyuan (TW)

(72) Inventor: Yi-Chang Wu, Taoyuan (TW)

(*) Notice: Subject to any disclaimer, the term of this patent is extended or adjusted under 35 U.S.C. 154(b) by 0 days.

(21) Appl. No.: 18/231,869

(22) Filed: Aug. 9, 2023

(65) Prior Publication Data

US 2024/0328448 A1 Oct. 3, 2024

(30) Foreign Application Priority Data

Mar. 31, 2023 (TW) ................. 112112553

(51) Int. Cl.
*F16B 21/18* (2006.01)
*F16B 5/06* (2006.01)

(52) U.S. Cl.
CPC .......... *F16B 21/186* (2013.01); *F16B 5/0642* (2013.01)

(58) Field of Classification Search
CPC ............... F16B 21/186; F16B 5/064
See application file for complete search history.

(56) References Cited

U.S. PATENT DOCUMENTS

| | | | | |
|---|---|---|---|---|
| 4,139,975 | A * | 2/1979 | Baker | F16B 5/00 432/247 |
| 4,532,926 | A * | 8/1985 | O'Holla | A61B 17/0643 606/220 |
| 2008/0147116 | A1 * | 6/2008 | Smith | A61B 17/10 606/220 |
| 2013/0294862 | A1 * | 11/2013 | Manahan | E05C 19/00 411/166 |
| 2014/0325798 | A1 * | 11/2014 | Foreman | F16L 3/2334 24/16 PB |
| 2016/0001945 | A1 * | 1/2016 | Foreman | B65D 63/1063 24/16 PB |
| 2016/0356298 | A1 * | 12/2016 | Pquet | F16B 21/065 |
| 2018/0258970 | A1 * | 9/2018 | Avetisian | F16B 13/045 |
| 2020/0049190 | A1 * | 2/2020 | Hersh | F16B 39/26 |
| 2022/0090614 | A1 * | 3/2022 | Müller | F16B 37/044 |
| 2023/0031903 | A1 * | 2/2023 | Brekke | F16B 15/0023 |

FOREIGN PATENT DOCUMENTS

ES 2424899 A 10/2013

* cited by examiner

*Primary Examiner* — David M Upchurch
(74) *Attorney, Agent, or Firm* — BACON & THOMAS, PLLC

(57) ABSTRACT

A fastener device includes a body portion and a second clamping portion. The body portion includes a first clamping portion and a shank portion, where the shank portion is fixed to the first clamping portion, and the second clamping portion includes an engaging member. The engaging member is provided with an opening, and a first protruding structure. The opening allows the shank portion to pass therethrough, and that the first protruding structure is adjacent to the opening. The shank portion includes a rack structure, such that when the shank portion is inserted into the opening, the first protruding structure will be engaged with the rack structure.

7 Claims, 9 Drawing Sheets

FASTENER DEVICE

BACKGROUND OF THE INVENTION

1. Field of the Invention

The present invention relates to a fastener device, and more particularly, to a detachable fastener device.

2. Description of Related Art

For industrial design or interior design, fastener devices are often employed to join different objects. When in use, two objects are drilled, at overlapped places, with holes through which fastener devices are inserted so as to fasten together the objects. Such fastening measure relates to a mechanical fastening measure.

Currently for conventional fastener devices of mechanical fastening measure, such as screws and nuts, which are each provided, correspondingly, with threads, so that the screws and nuts can be engaged with each other by way of rotational measure. However, such a fastening measure consumes much time and besides, has difficulties both in attachment and detachment. Moreover, to avoid frequent rotations and cause wearing out by frictions, the screws and nuts have to be made by metal materials. This adds more weight to the fastener devices, let alone costs are higher.

Given the above, with a spirit of aggressive innovation, in an attempt to overcome the shortages inherent in the above-mentioned mechanical typed fastener devices, a "Fastener Device" has been conceptualized; and with research and experiments undertaken, the present invention can be accomplished eventually.

SUMMARY OF THE INVENTION

An object of the present invention is to solve the problem, as mentioned above, and to provide a fastener device characterized by providing a structural design in use of a body portion having a first clamping portion and a shank portion, and of a second clamping, to simplify the process of fastening objects by conventional screws. This will effectively increase working efficiency. The following measures are conceived in the present invention.

To achieve the above-mentioned object, the fastener device, according to the present invention, comprises a body portion and a second clamping portion. The body portion includes a first clamping portion and a shank portion, where the shank portion is fixed to the first clamping portion, and the second clamping portion includes an engaging member. The engaging member is provided with an opening, and a first protruding structure. The opening allows the shank portion to pass therethrough, and that the first protruding structure is adjacent to the opening. The shank portion includes a rack structure, such that when the shank portion is inserted into the opening, the first protruding structure will be engaged with the rack structure.

According to the present invention, as an option, when the shank portion is inserted into the opening, at least one clamping space can be formed between the first clamping portion and the second clamping portion.

Further, according to the present invention, as an option, the shank portion includes a first side and a second side which are opposite to each other, where the rack structure is located at the first side, and where the second side is provided with a rail structure.

Still further, according the present invention, as an option, the engaging member is further provided with a second protruding structure, where the second protruding structure is adjacent to the opening, and where the second protruding structure and the first protruding structure are arranged at opposite sides of the opening, respectively.

According to the present invention, as an option, the rail structure is employed to receive the second protruding structure.

Further, according to the present invention, as an option, the engaging member is further provided with two extended slots which are in communication with the opening.

Still further, according to the present invention, as an option, the two extended slots are adjacent to the first protruding structure.

According to the present invention, as an option, the first protruding structure extends, substantially, along a second direction; whereas the second protruding structure extends substantially, along a first direction, such that the first direction and the second direction are in reverse directions to each other.

Further, according to the present invention, as an option, the rack structure includes, at periphery, two edge strips, where the two extended slots are employed to receive the two edge strips.

Still further, according to the present invention, as an option, the body portion and/or the second clamping portion are made of elastic material.

Both the above-mentioned summery and the following detailed description are made as exemplification, and are provided for further explaining the appended claims. Other objects, advantages, and novel features of the invention will become more apparent from the following detailed description when taken in conjunction with the accompanying drawings.

DETAILED DESCRIPTION OF THE PREFERRED EMBODIMENT

Figure 1:
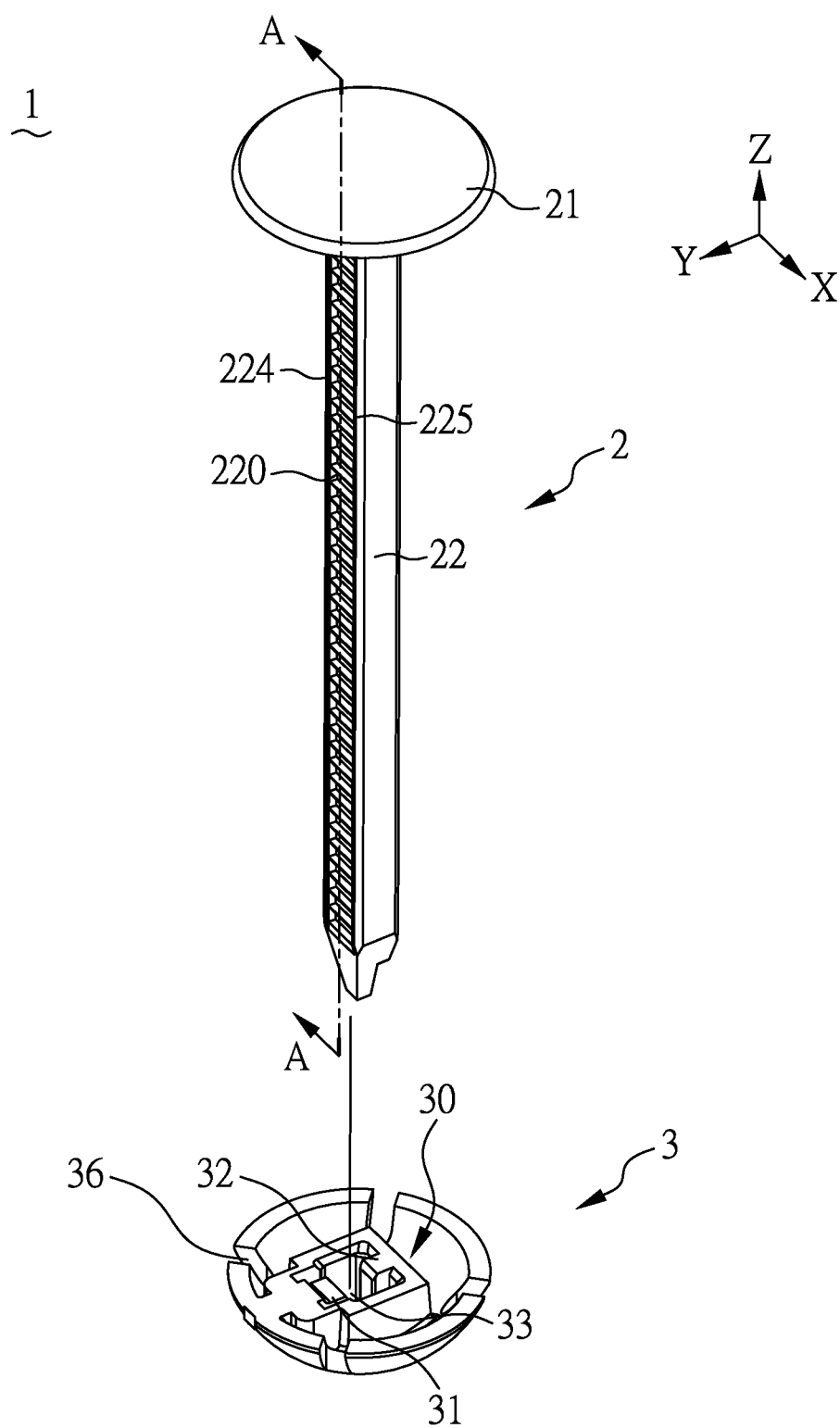
FIG. 1 is a perspective view illustrating a disassembled fastener device according to the present invention.

In accompanying the drawings to read the disclosure of the present invention, the following are proposed with various embodiments to clearly describe the contents, features and/or effects of techniques of the present invention. People can realize, through the description of the embodiments, the technical measure and effects adopted in the present invention for achieving the above-mentioned objects. Furthermore, the disclosure of the present invention can be understood easily to enable persons skilled in the art to implement the present invention. Various equivalent replacement or modifications without departing from the spirit of the present invention shall be covered in the claims for patent.

It is noted that, in the text of the specification, unless otherwise specified, having "a" component does not limit to having single one of such component, but instead may refer to one or more of such component.

In addition, in the specification and claims, unless otherwise specified, ordinal numbers, such as "first" and "second", used herein are intended to distinguish components rather than to disclose explicitly or implicitly the components bearing the wording of the ordinal numbers. The ordinal numbers do not imply what orders a component and another component are, in terms of space, time or steps of a manufacturing method. These ordinal numbers are used only to distinguish one element with a particular name from another element with the same name.

In addition, the term "adjacent" used herein may refer to describe mutual proximity and does not necessarily mean mutual contact.

In addition, the description of "when . . . " or "while . . . " in the disclosure of the present invention means "now, before, or after", etc., and is not limited to occurrence at the same time. In the disclosure of the present invention, a similar description of "disposed on" or the like refers to a corresponding positional relationship between two components, and does not limit whether there is contact between the two components, unless specifically limited. Furthermore, when the disclosure of the present invention recites multiple effects, if the word "or" is used between the effects, it means that the effects can exist independently, but it does not exclude that multiple effects can exist at the same time.

Further, the term "connect" or "couple" in the specification and claims not only refers to direct connection with other component, but also refer to indirect connection with another component.

Still further, in the specification and claims, the term "almost", "about", "approximately" or "substantially" usually means within 10%, or 5%, or 3%, or 2%, or 1%, or within 0.5% of a given value or range. The quantity given is a value of approximate quantity, which means that the meaning of "almost", "about", "approximately" or "substantially" may still be implied in the absence of a specific description of "almost", "about", "approximately" or "substantially". In addition, the terms "ranging from the first value to the second value" and "range between the first value and the second value" indicate that the range includes the first value, the second value, or other values between the first value and the second value.

In addition, the technical features of different embodiments as disclosed may be combined to form another embodiment.

Figure 2:
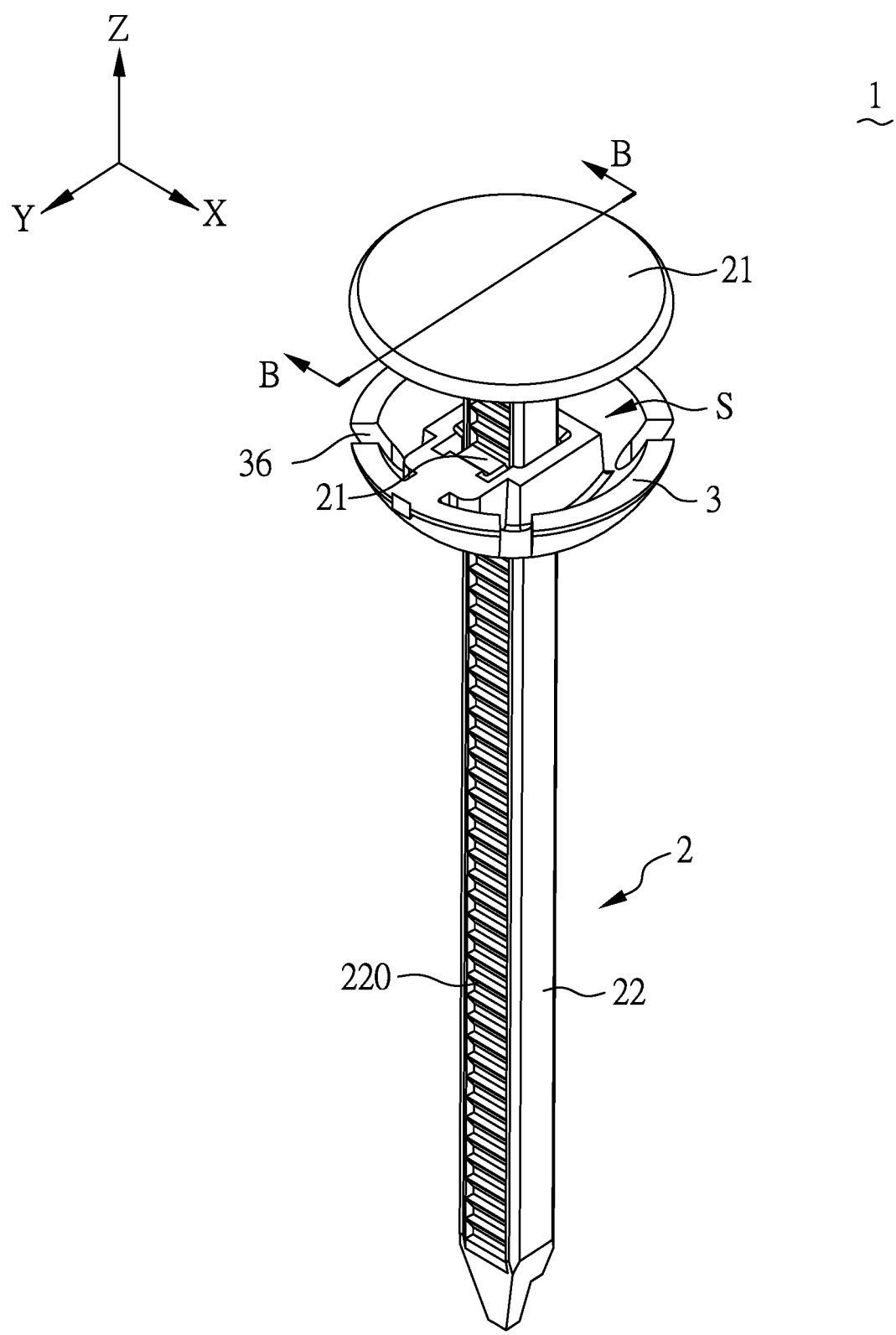
FIG. 2 is a perspective view illustrating an assembled fastener device according to the present invention.

References are made to FIG. 1, an exploded view illustrating a disassembled fastener device according to the present invention; and FIG. 2, a perspective view illustrating an assembled fastener device according to the present invention.

As shown in FIG. 1, the fastener device 1 comprises, among others, a body portion 2 including a first clamping portion 21 and a shank portion 22, where the shank portion 22 is fixed to center of the first clamping portion 21. The shank portion 22 includes a rack structure 220, such that the rack structure 220 extends along the shank portion 22 longitudinally, taking for instance, along axis Z as shown in FIG. 1, though not so limited. The fastener device 1 further comprises a second clamping portion 3, such that the second clamping portion 3 can be attached to the body portion 2, or otherwise detached therefrom. The second clamping portion 3 includes an engaging member 30, where the engaging member 30 may be positioned at the center of the second clamping portion 3. The engaging member 30 is provided with an opening 33, and a first protruding structure 31 adjacent to the opening 33. The opening 33 has a shape corresponding to that of the shank portion 22, and that the opening 33 has a dimension substantially greater than or equal to a cross-sectional dimension, in a horizontal direction (for instance at an X-Y plane), of the shank portion 22, such that the opening 33 can allow the shank portion 22 to be inserted therein. Further, as shown in FIG. 2, when the shank portion 22 is inserted into the opening 33, the first protruding structure 31 will be engaged with the rack structure 220, so as to maintain a distance between the first clamping portion 21 and the second clamping portion 3 in a longitudinal direction (for instance in a Z direction), where such distance is equal to or greater than zero (0). At this moment, a clamping space S can at least be formed between the first clamping portion 21 and the second clamping portion 3. On the other hand, in case the second clamping portion 3 is exerted with a certain force, the first protruding structure 31 or the rack structure 220 can be slightly deformed so as to make the first protruding structure 31 and the rack structure 220 disengage from each other temporarily, and to allow the second clamping portion 3 to adjust its position on the shank portion 22, though not so limited.

Still further, detailed descriptions will be made hereunder on components of the fastener device 1 according to the present invention. For convenience, X-, Y-, and Z-directions will be used to help describe arrangement of the components. Namely, the shank portion 22 extends in a direction defined as +Z-direction or −Z-direction; whereas an X-direction and a Y-direction are perpendicular to a Z-direction, respectively.

Figure 3:
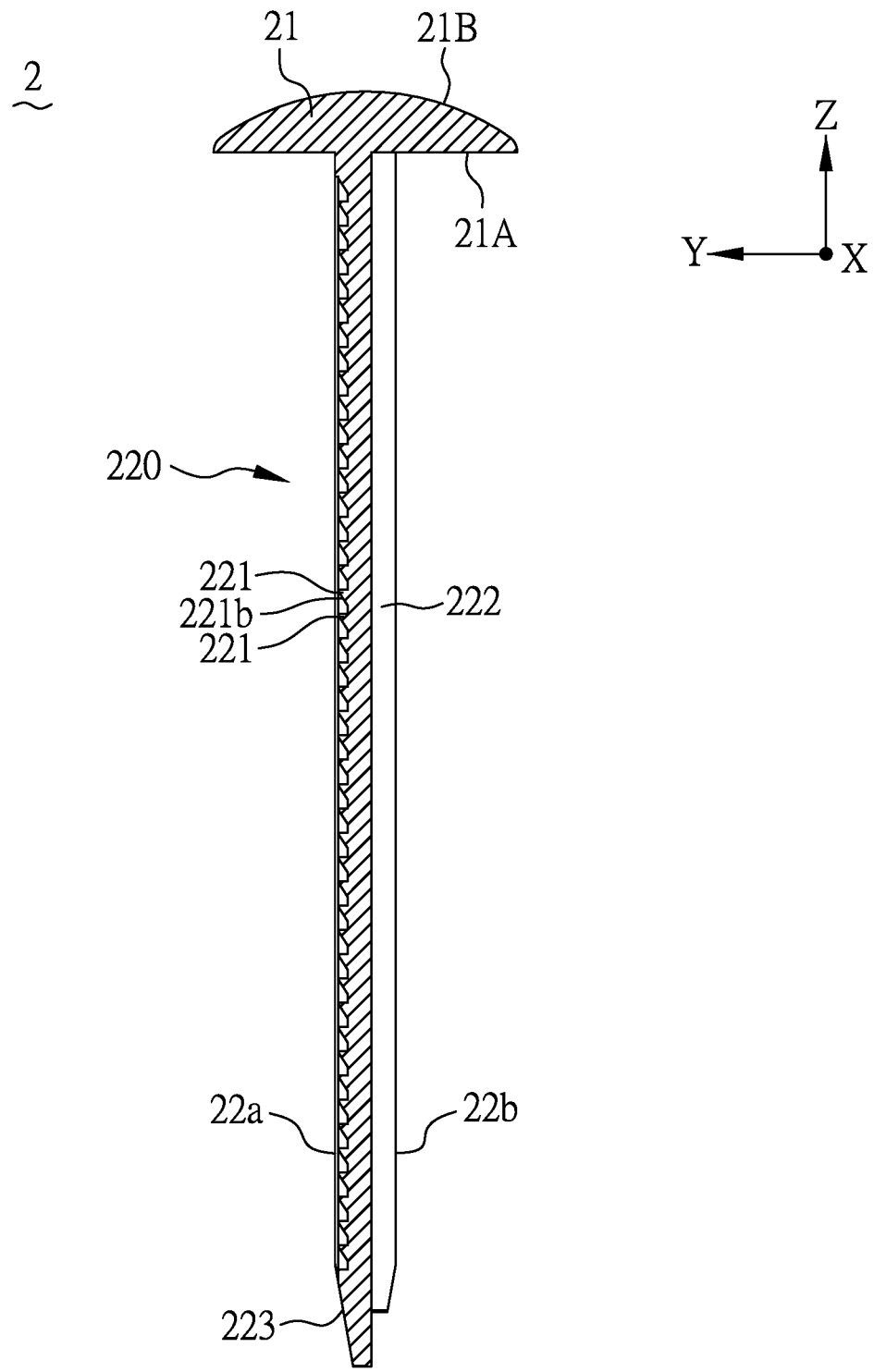
FIG. 3 is a cross-sectional view, along cutting line A-A of FIG. 1, illustrating a body portion of the fastener device according to the present invention.
Figure 4:
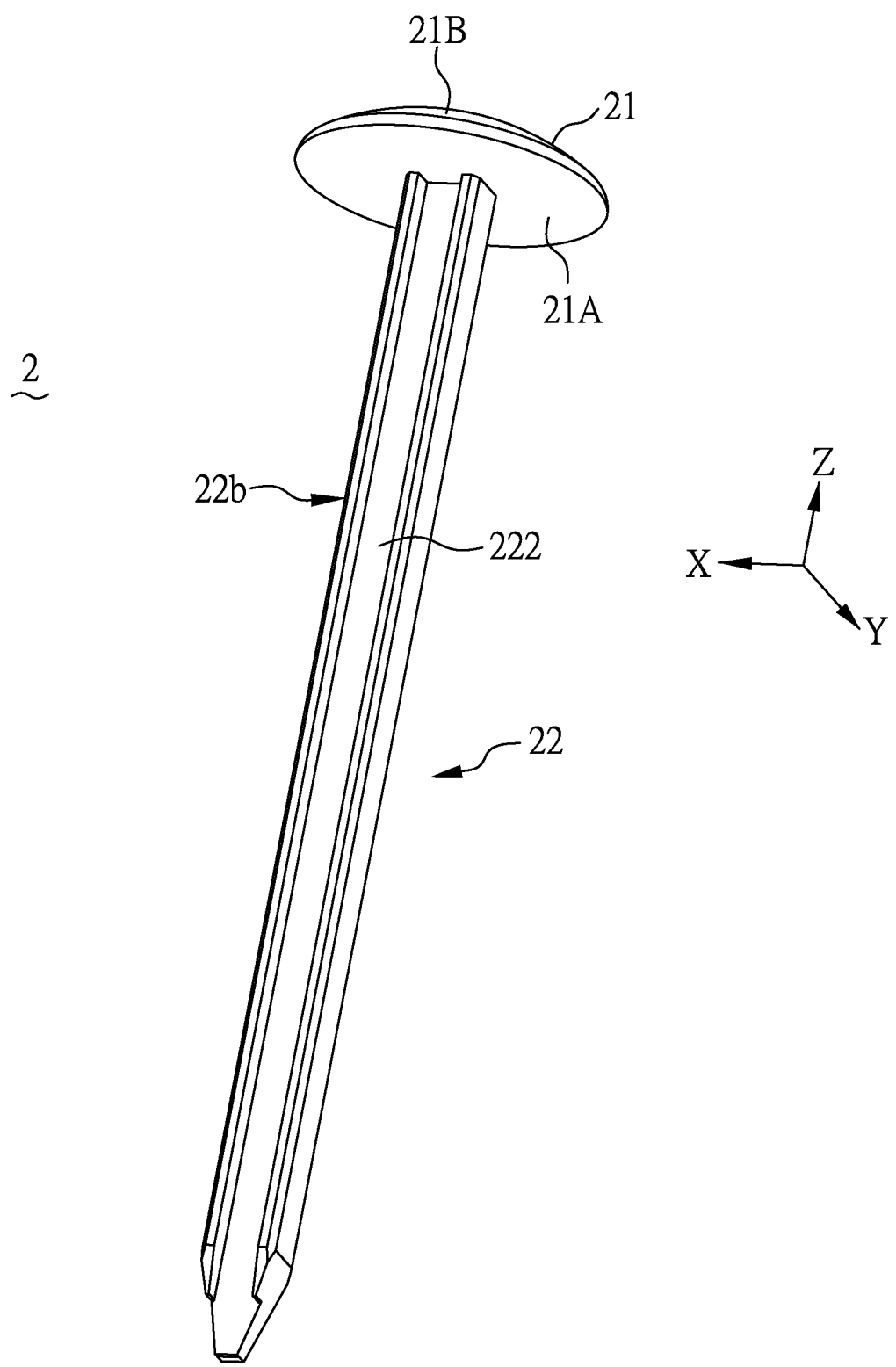
FIG. 4 is a perspective view illustrating the body portion of the fastener device according to the present invention.

Now, for describing the body portion 2, references are made to FIG. 3, a cross-sectional view, along cutting line A-A of FIG. 1, illustrating the body portion 2 of the fastener device 1 according to the present invention; and FIG. 4, a perspective view illustrating the body portion 2; and also to FIG. 1, in which features of the body portion 2 are revealed in different perspectives.

Further, as shown in FIG. 3 and FIG. 4, the body portion 2 includes a first side 22a and a second side 22b, which are opposite to each other, where the rack structure 220 is located at the first side 22a; and where the second side 22b is provided with a rail structure 222. According to the present invention, the rail structurer relates to a groove, though not so limited.

Still further, according to the present invention, the rack structure 220 includes a plurality of teeth 221, where neighboring teeth 221 are formed with depressions 221b; and where the first protruding structure 31 (see FIG. 1) is engaged with the depression 221b, though not so limited. According to the present invention, either the teeth or the depressions 221b have a shape corresponding to the first protruding structure 31 (see FIG. 1), namely engaged with each other; or the depressions 221b have a shape able to restrain the first protruding structure 31. As a result, when the first protruding structure 31 is engaged with the depression 221b, neighboring two teeth 221 will be engaged therewith, and refrained therefrom, so as to facilitate engaging with each other. Besides, as shown in FIG. 1, the rack structure 220 includes, at periphery, at least two edge strips 224, 225 (see FIG. 1), where the edge strips 224, 225 may be of elongated structure, and the rack structure 220 is interposed between the edge strips 224, 225, though not so limited.

Further, according to the present invention, the first clamping portion 21 has an inner surface 21A and an outer surface 21B, such that the inner surface 21A can, for instance, be parallel with a plane in an X-direction or in a Y-direction, though not so limited. The shank portion 22 is integral with the inner surface 21A, and extends along a Z-direction (or a −Z direction). The outer surface 21B may be a curved surface, though not so limited, namely the outer surface 21B may be of plane or of other shape. In other words, as viewed from a lateral direction (X-direction or Y-direction), the first clamping portion 21 has a like-semicircular, or like-semielliptical projected shape. Alternatively, the first clamping portion 21 may be of other shape, for instance rectangular, though not so limited. Still alternatively, the shank portion 22 may have a bottom (namely an end of the shank portion 22 away from the first clamping portion 21) including a bevel 223, where the bevel 223 facilitates the shank portion 22 inserting into the opening 33 of the second clamping portion 3, though not so limited.

Figure 5:
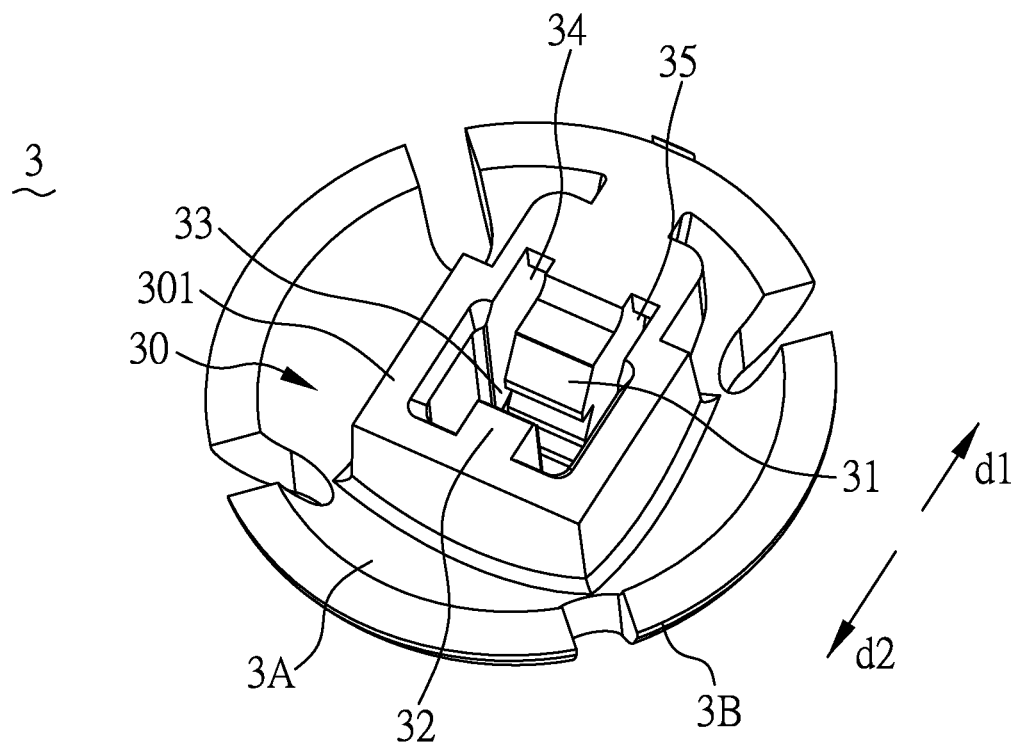
FIG. 5 is a top view illustrating a second clamping portion of the fastener device according to the present invention.
Figure 6:
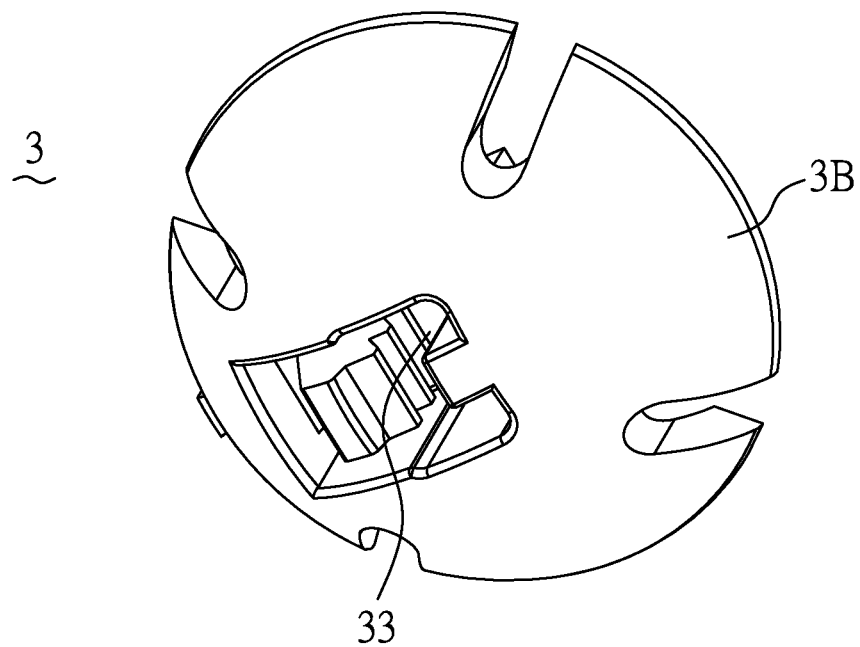
FIG. 6 is a bottom view illustrating the second clamping portion of the fastener device according to the present invention.

Now references are made to FIG. 5, a top view illustrating the second clamping portion 3; and FIG. 6, a bottom view illustrating the second clamping portion 3; and also to FIG. 1. The second clamping portion 3 includes an inner surface 3A and an outer surface 3B, such that both the inner surface 3A and the outer surface 3B may be of curved surfaces, though not so limited. The engaging member 30 is located at center of the second clamping portion 3, where the engaging member 30 relates to a hollow structure such that the hollow portion may be of the opening 33. Besides, the engaging member 30 includes a guiding wall 301 protruded along normal line of the inner surface 3A, where the guiding wall 301 surrounds the opening 33.

According to the present invention, the guiding wall 301 has one side including the first protruding structure 31 adjacent to the opening 33; and has another side including a second protruding structure 32 opposite to the first protruding structure 31 and adjacent to the opening 33. In other words, the second protruding structure 32 and the first protruding structure 31 are provided at opposite sides of the opening 33. Namely, the first protruding structure 31 extends toward the opening 33 along a second direction d2; whereas the second protruding structure 32 extends toward the opening 33 along a first direction d1, such that first direction d1 and second direction d2 are in different directions from each other, or even in reverse directions to each other. Besides, the rail structure 222 of the body portion 2 (see FIG. 4) can be employed to receive the second protruding structure 32, such that the groove of the rail structure 222 has a dimension greater than or equal to that of the second protruding structure 32.

Further, according to the present invention, the engaging member 30 is further provided with two extended slots 34, 35 which are in communication with the opening 33, and which are adjacent to the first protruding structure 31. The two extended slots 34, 35 can be employed to receive the two edge strips 224, 225 of the body portion 2, namely either one of the two extended slots 34, 35 has a dimension greater than or equal to that of either one of the two edge strips 224, 225, though not so limited.

Still further, according to the present invention, the opening 33 of the engaging member 30 has a shape corresponding to that of the shank portion 22. When the shank portion 22 is inserted into the opening 33, the first side 22a of the shank portion 22 faces to the first protruding structure 31 of the engaging member 30; whereas the second side 22b of the shank portion 22 faces to the second protruding structure 32 of the engaging member 30, such that the first protruding structure 31 is engaged with the rack structure 220, and that the second protruding structure 32 is located in the rail structure 222 for orientation, whereas the guiding wall 301 can be employed to stabilize the shank portion 22 so as to avoid displacement or shaking of the shank portion 22.

Figure 7:
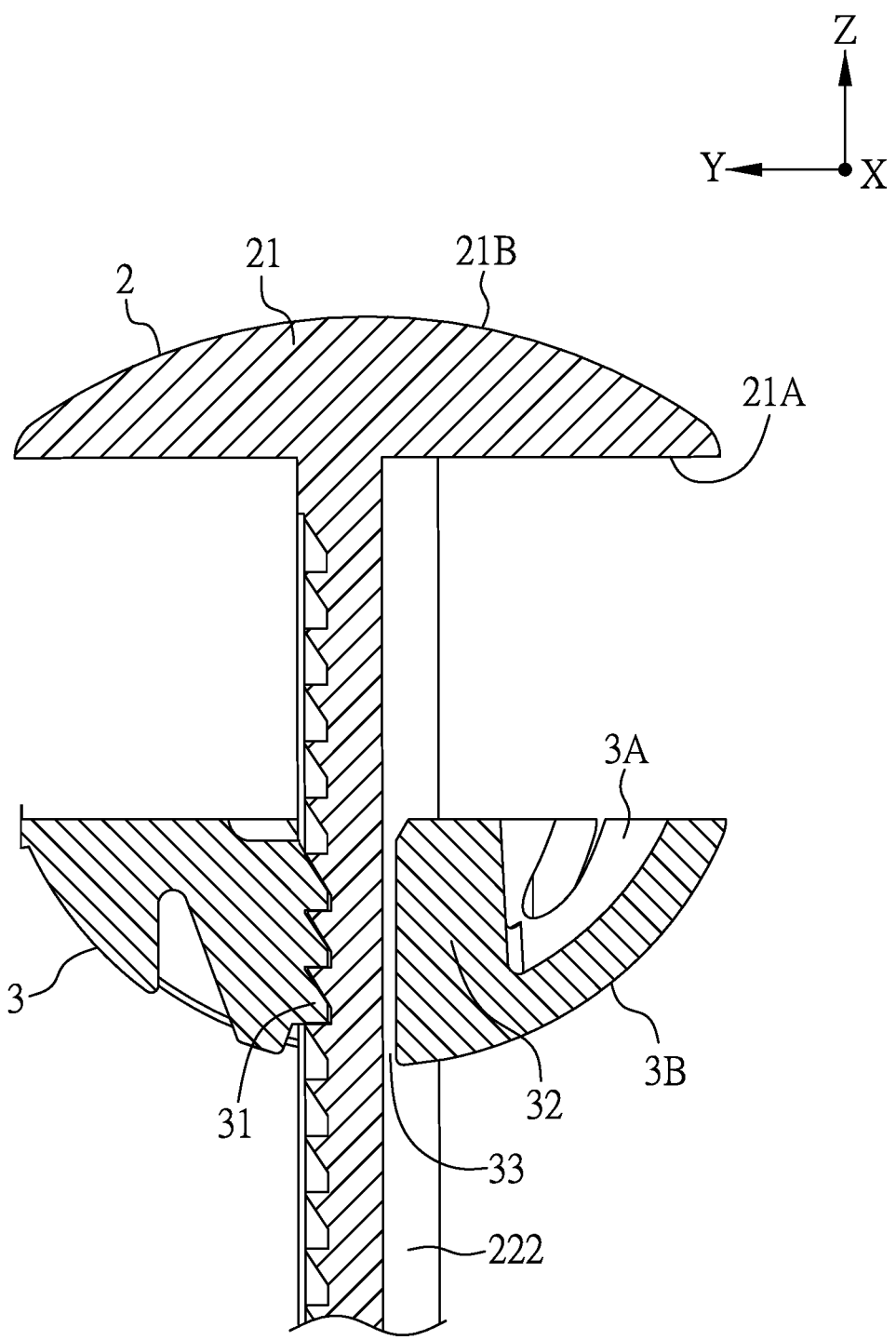
FIG. 7 is a partial cross-sectional view, along cutting line B-B of FIG. 2, illustrating the fastener device according to the present invention.

A reference is made to FIG. 7, a partial cross-sectional view, along cutting line B-B of FIG. 2, illustrating the fastener device 1 according to the present invention. As shown, the first protruding structure 31 of the second clamping portion 3 is resilient, so that a user can push the second clamping portion 3 in the Z-direction; or otherwise, can pull the second clamping portion 3 in a direction reverse to the Z-direction. This will make the first protruding structure 31 displace and/or deform so as to escape from an engaged status with the rack structure 220, and to alter the second clamping portion 3 from a position on the shank portion 22.

The following description relates to as to how the detachable fastener device 1, according to the present invention, is in use.

First, the detachable fastener device 1 is employed to fasten two objects 41, 42, where the two objects 41, 42 are, for instance, two wooden plates, though not so limited. The two objects 41, 42 had been drilled with holes h1, h2, already for passing therethrough the shank portion 22. Further references are made to FIG. 8A to FIG. 8C, schematic views illustrating the fastener device 1 in a process of fastening the two objects 41, 42 according to the present invention; and to FIG. 1 to FIG. 7.

Figure 8A:
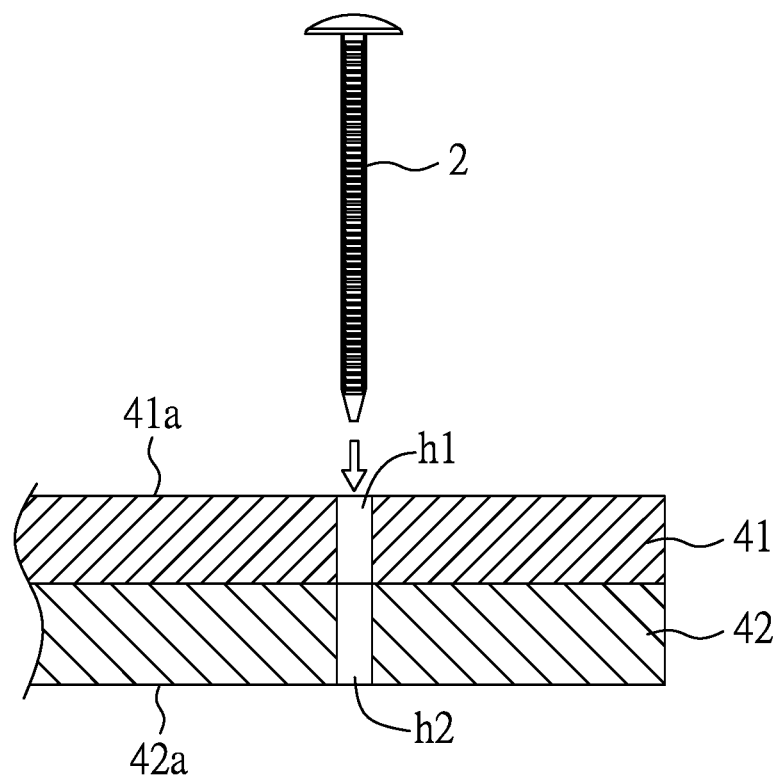
FIG. 8A to FIG. 8C are schematic views illustrating the fastener device in a process of fastening two objects according to the present invention.
Figure 8B:
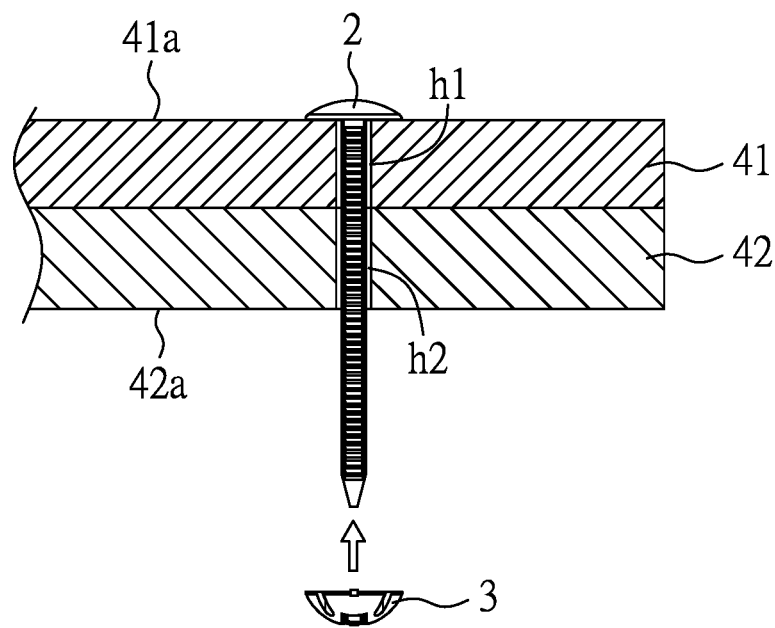
Figure 8C:
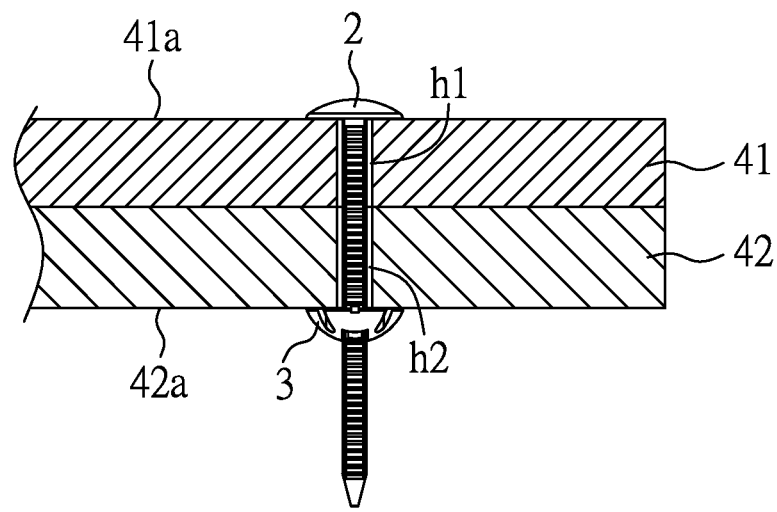

As shown in FIG. 1 and FIG. 8A, when the holes h1, h2 of the two objects 41, 42 are aligned with each other, the shank portion 22 can pass, from above in the Z-direction, through the holes h1, h2 of the two objects 41, 42. Thereafter, as shown in FIG. 1 and FIG. 8B, the first clamping portion 21 can abut against a surface 41a of the neighboring object 41; whereas the second clamping portion 3 can sleeve into the shank portion 22 from underneath of the two objects 41, 42 (for instance, the shank portion 22 passes through the opening 33). Then, as shown in FIG. 1, FIG. 5, and FIG. 8C, the second clamping portion 3, after having sleeved thereinto with the shank portion 22, can abut against a surface 42a of the neighboring object 42; and in addition, the second clamping portion 3 and the rack structure 220 of the shank portion 22 are engaged with each other at a place adjacent to the surface 42a of the neighboring object 42, such that the second clamping portion 3 can be engaged with the rack structure 220. As such, the two objects 41, 42 are fastened together.

Figure 9A:
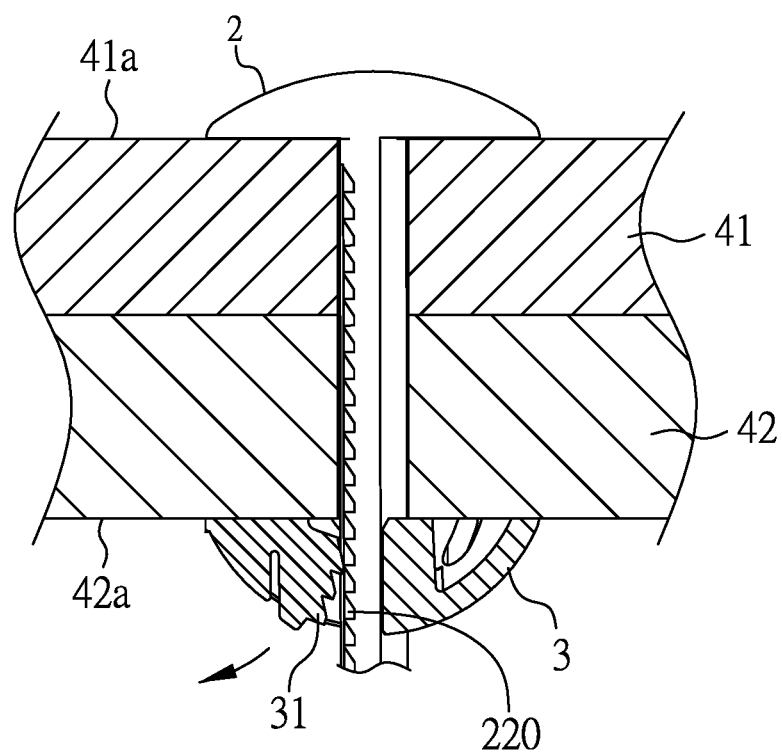
FIG. 9A and FIG. 9B are schematic views illustrating the fastener device in a process of detaching apart from the two objects according to the present invention.
Figure 9B:
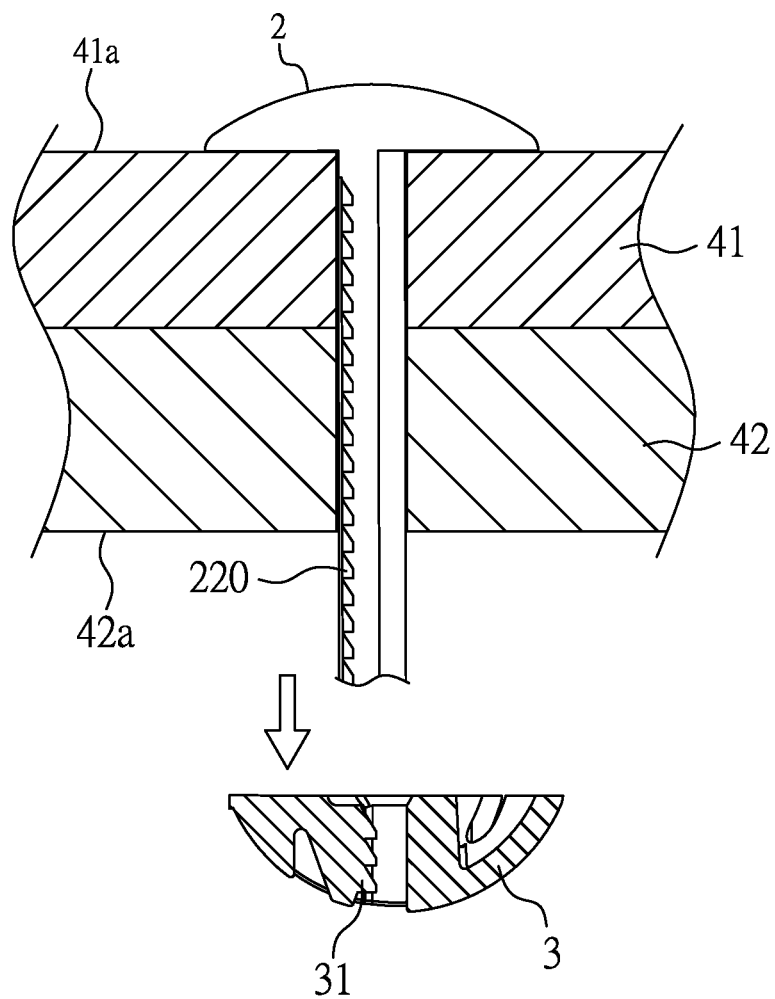

Subsequently, the following relates to as to how the detachable fastener device 1 is detached apart. Now references are made to FIG. 9A and FIG. 9B, schematic views illustrating the fastener device 1 in a process of detaching apart from the two objects 41, 42 according to the present invention. When in the event of detaching the second clamping portion 3 apart from the body portion 2, an external force can be applied to the second clamping portion 3, making the second clamping portion 3 deform. As such, the first protruding structure 31 can be disengaged from the rack structure 220. Then an external force, exerted in a direction away from the first clamping portion 21 to pull the second clamping portion 3 so as to make the second protruding structure 32 move along the rail structure 222 of the shank portion 22, in a direction away from the first clamping portion 21, and apart from the shank portion 22.

According to the present invention, in view of the fact that the body portion 2 and/or the second clamping portion 3 are made of elastic plastic material, a greater ductility can be obtained. As such, in case an external force is applied to the body portion 2 and/or the second clamping portion 3, the body portion 2 and/or the second clamping portion will deform, making the second clamping portion 3 disengage readily from the body portion 2. Further, according to the present invention, under the circumstances that no external force is exerted on the shank portion 22, the shank portion 22 can be maintained in a stretched status.

Further references are made to FIG. 1 and FIG. 2, according to the present invention, the second clamping portion 3 is provided with a plurality of indentations 36 symmetrically arranged along edge of the second clamping portion 3. The plural indentations 36 will make the engaging member 30 of the second clamping portion 3 more resilient, and more tightly engage with the rack structure 220.

Given the above, the present invention is to provide a detachable fastener device 1, easy to assemble and detach, for replacing functions of the well-known screws and nuts, let alone the cost of manufacturing can be lowered.

Moreover, according to the present invention, features of the embodiments, as mentioned above, can be mixed and matched randomly, so long as not to depart from the spirit of the invention.

Although the present invention has been explained in relation to its preferred embodiments, it is to be understood that the specific embodiments are for the purpose of illustration and not of limitation, and that many other possible modifications and variations can be made without departing from the scope of the invention as hereinafter claimed.

What is claimed is:

1. A fastener device, comprising:
   a body portion, including a first clamping portion and a shank portion, wherein the shank portion is fixed to the first clamping portion; and
   a second clamping portion, including an engaging member, wherein the engaging member is provided with an opening, and a first protruding structure, and wherein the opening allows the shank portion to pass therethrough, and the first protruding structure is adjacent to the opening;
   wherein, the shank portion includes a rack structure, such that when the shank portion is inserted into the opening, the first protruding structure will be engaged with the rack structure;
   wherein when the shank portion is inserted into the opening, at least one clamping space is formed between the first clamping portion and the second clamping portion;
   wherein the shank portion includes a first side and a second side which are opposite to each other, and wherein the rack structure is located at the first side, and the second side is provided with a rail structure;
   wherein the engaging member is further provided with two extended slots which are in communication with the opening.

2. The fastener device as claimed in claim 1, wherein the engaging member is further provided with a second protruding structure, and the second protruding structure is adjacent to the opening, and wherein the second protruding structure and the first protruding structure are arranged opposite to each other.

3. The fastener device as claimed in claim 2, wherein the rail structure is employed to receive the second protruding structure.

4. The fastener device as claimed in claim 1, wherein the two extended slots are adjacent to the first protruding structure.

5. The fastener device as claimed in claim 1, wherein the first protruding structure extends, substantially, along a second direction, and the second protruding structure extends substantially, along a first direction, such that the first direction and the second direction are in reverse directions to each other.

6. The fastener device as claimed in claim 1, wherein the rack structure includes, at periphery, two edge strips, and the two extended slots are employed to receive the two edge strips.

7. The fastener device as claimed in claim 1, wherein the body portion and/or the second clamping portion are made of elastic material.

\* \* \* \* \*